United States Patent [19]

Shankar et al.

[11] Patent Number: 4,991,924
[45] Date of Patent: Feb. 12, 1991

[54] OPTICAL SWITCHES USING CHOLESTERIC OR CHIRAL NEMATIC LIQUID CRYSTALS AND METHOD OF USING SAME

[75] Inventors: Narendra K. Shankar; Jeffrey A. Morris; Clifford R. Pollock, all of Ithaca; Christopher P. Yakymyshyn, Saratoga Springs, all of N.Y.; T. Wilson Whitehead, Raleigh, N.C.

[73] Assignees: Cornell Research Foundation, Inc., Wilmington, Del.; E. I. du Pont de Nemours & Company, Ithaca, N.Y.

[21] Appl. No.: 354,304

[22] Filed: May 19, 1989

[51] Int. Cl.$^5$ .............. G02B 6/26; G02B 5/30; G02F 1/13

[52] U.S. Cl. ................ 350/96.15; 350/96.18; 350/96.20; 350/320; 350/337; 350/338; 350/347 V; 350/347 E; 350/350 R; 350/352; 350/377

[58] Field of Search ......... 350/96.15, 96.16, 96.18, 350/96.20, 330, 337, 338, 34.7 R, 347 V, 347 E, 350 R, 352, 374, 377, 320

[56] References Cited

U.S. PATENT DOCUMENTS

| | | | |
|---|---|---|---|
| 4,278,327 | 7/1981 | McMahon et al. | 350/347 V |
| 4,367,924 | 1/1983 | Clark et al. | 350/334 |
| 4,697,884 | 10/1987 | Amstutz et al. | 350/334 |
| 4,726,663 | 2/1988 | Buzak | 350/347 E |
| 4,755,038 | 7/1988 | Baker | 350/347 V |
| 4,784,470 | 11/1988 | Baker | 350/347 E |

OTHER PUBLICATIONS

Scheffer, "Twisted Nematic Display with Cholesteric Reflector", J. of Physics D., vol. 8, No. 12, pp. 1441–1449, 8/75.

"Electrically Controlled Optical Switch for Multimode Fiber Applications", by R. E. Wagner and J. Cheng, Sep. 1, 1980, vol. 19, No. 17, Applied Optics, pp. 2921–2925.

"Fiber-Optic Switching with Liquid Crystals", by Richard A. Soref, SPIE, vol. 176, Guided Wave Optical Systems & Devices II, (1979), pp. 124–132.

*Primary Examiner*—Brian Healy
*Attorney, Agent, or Firm*—Jones, Tullar & Cooper

[57] ABSTRACT

Fiber optic switches using layers of cholesteric or chiral nematic liquid crystals (CLCs) are disclosed. The CLC layer acts both as a polarization beamsplitter and as a reflector by decomposing incoming unpolarized light into two orthogonal circularly polarized components. In a number of embodiments, switchable waveplates are employed to controllably switch the polarization direction of each of the polarization components. The components are then reflected back toward the CLC layer where they are recombined into a transmitted unpolarized beam. The direction of transmission depends on the circular sense of the polarized components, and therefore on the state of the switchable waveplates. In other embodiments, the CLCs are used actively by selectively exposing them to electric or magnetic fields or to heat which cause a phase change that temporarily neutralizes the circular polarization effect. In this manner, the CLCs can be used as switch elements themselves.

18 Claims, 9 Drawing Sheets

ZERO DELAY

FIG. 1A

¼ WAVE DELAY

FIG. 1B

ZERO DELAY

FIG. 2A

½ WAVE DELAY

OPTICAL SWITCHES USING CHOLESTERIC OR CHIRAL NEMATIC LIQUID CRYSTALS AND METHOD OF USING SAME

BACKGROUND OF THE INVENTION

The present invention relates, in general, to fiber optic switches which employ cholesteric or chiral nematic liquid crystals and switchable waveplates.

A number of different types of optical switches for switching light between optical fibers are known in the art. Electro-mechanical fiber optic switches have provided the best overall device performance specifications, with insertion losses of 1 dB, crosstalk between unselected fibers of −50 dB, and a 25 ms switching time, howewer, these types of switches require high driving powers and have short life times due to wear, abrasion, and fatigue. Although non-mechanical devices promise longer life, greater reliability, lower power consumption, and shorter switching times, no non-mechanical device has yet fully matched the performance levels of an electro-mechanical switch.

Several liquid crystal materials have been used in non-mechanical optical fiber switches. Nematic liquid crystals have been used in switchable half-wave plates in combination with linear polarization beamsplitters, as well as in switchable total internal reflection structures. Ferroelectric crystals have also been used as switchable half waveplates possessing a fast response speed and bistability. Many of these liquid crystal based optical fiber switches rely on polarization splitting techniques to separate and recombine the two linearly polarized components of an optical beam. To achieve good contrast ratios and low insertion losses, expensive polarization beamsplitters or optical quality calcite crystals are required. The mechanical arrangement of optical components is complicated, and the increased number of optical surfaces requiring anti-reflection coatings further raises device costs.

SUMMARY OF THE INVENTION

It is therefore the object of the present invention to provide a non-mechanical optical fiber switch that has performance specifications equalivant to an electro-mechanical optical switch, yet is mechanically simple, and inexpensive.

This, and other, objects of the invention are achieved by providing an optical switch which utilizes a cholesteric or chiral nematic liquid crystal (CLC) layer as a circular polarization beamsplitter. Cholesteric or chiral nematic liquid crystals have electro-optic properties which are very different from those of other liquid crystals, and in particular, from those of nematic liquid crystals (NLCs). NLC cells typically rotate linear polarization states (e.g., twisted-nematic liquid crystal cells) or transform polarization states (i.e., perform phase modulation). Typically, these effects are accomplished by applying an electric field across the NLC layer. If NLC cell are used in conjunction with other external polarizers, mirrors, or beamsplitting schemes, they can be used to perform light intensity (amplitude) modulation or to discriminate polarization states; however, these qualities are not inherent in the NLC cells themselves.

On the other hand, unpolarized light of a suitable wavelength imprinted upon an aligned CLC layer at angles near normal incidence is decomposed into opposite circularly polarized components. The CLC layer acts itself as a retro-reflecting beamsplitter, so that light of one circular polarization is specularly reflected from the layer, while light of the opposite circular polarization is transmitted through the layer. This selective reflection can be extended to angles of incidence substantially away from normal incidence by appropriate adjustment of the CLC's helical pitch. Another effect of CLC layers occurs at suitably large angles of incidence, where complete specular reflection of all polarization of incident light can occur. Furthermore, by applying electric or magnetic fields or heat to the CLC layer, the CLC can be converted to the nematic or isotropic phase, so that the layer will no longer have any effect on the incident unpolarized light.

The above characteristics of CLCs enables the construction of simple and inexpensive optical switches. By using CLC layers in conjunction with simple mirrors and switchable waveplates, many different optical switching structures can be constructed. In general, these structures require fewer components and are relatively inexpensive as compared to prior non-mechanical optical switches. They are also, in general, more compact, and thus exhibit lower insertion loss than typical liquid crystal switches. Since circular polarization states are used for switching, the relative orientation of any switchable waveplates and CLC layers is unimportant. No separate polarization splitting or recombining optical elements are required, since the CLC layer automatically performs these functions.

As an example, in one embodiment of the present invention, a pair of switchable quarter-waveplates are disposed, one on either side, of a CLC layer to form a mechanically simple three layer structure which can be used to switch unpolarized light between two pairs of optical fibers. The CLC layer acts to separate incident unpolarized light into a left circularly polarized component and a right circularly polarized component. One of these components will be transmitted through the layer, while the other will be reflected in the opposite direction of the transmitted component. If mirrors are disposed on either side of the CLC layer to reflect the circular unpolarized components back to the CLC layer and in the process, reverse their circular sense, the components will be recombined into an unpolarized light beam, and transmitted in a direction opposite to that of the incident unpolarized light beam. However, if a voltage is applied to the switchable waveplates on either side of the CLC layer, this will act to change the polarization of each component from circular to linear. The mirrors on either side of the CLC layer reflect these linear polarized components back toward the CLC layer, unchanged, and the waveplates will reconvert them back to their original circularly polarized sense. Then the beams will recombine in the CLC layer and form an unpolarized beam. However, the beam will be transmitted by the CLC layer in the same direction as that of the original incident unpolarized light beam. Proper placement of optical fibers on either side of the CLC optical switch will permit light to be selectively transmitted from one fiber to another depending upon the voltage applied to the switchable waveplates.

BRIEF DESCRIPTION OF THE DRAWINGS

The foregoing and additional objects, features, and advantages of the present invention will become apparent from a consideration of a detailed description of preferred embodiments thereof, taken in conjunction with the accompanying drawings in which.

DETAILED DESCRIPTION OF THE PREFERRED EMBODIMENTS

Turning now to a more detailed consideration of the present invention, chiral nematic or cholesteric liquid crystals are characterized by the act that the direction of the long molecular axes in each successive layer of molecules forms a given angle with the direction of the axes of molecules in the preceding layer. This forms a helix whose pitch P is dependent on the nature of the molecules and on external forces, such as temperature and electric fields. Due to this characteristic, light having a wavelength within the following range of the CLC's characteristic pitch P will interact strongly with a CLC layer:

$$nP(1-\delta)^{\frac{1}{2}} < \lambda < nP(1+\delta)^{\frac{1}{2}}$$

where, the average refractive index is n, and the parameter:

$$\delta = (n_e^2 - n_o^2)/(n_e^2 + n_o^2)$$

is an optical dielectric anisotropy of the liquid crystal. With the CLC layer oriented so that its helical axis is nearly parallel to the direction of propagation of an incident light beam, any incident circularly polarized component with the same rotary sense as the CLC helix undergoes specular reflection. The reflectance approaches unity if nL is much greater than the wavelength of the light, where L is the thickness of the CLC layer. The other polarization component of the incident light beam will be transmitted as an optical beam with no absorption, very little scattering loss, and no significant spatial mode distortion. This effect can be extended to angles of incidence substantially away from normal incidence by appropriate adjustment of the CLC's helical pitch. CLCs therefore act as circular polarization beamsplitters for light of the appropriate wavelength and incident angle.

A large number of different combinations of switchable and non-switchable CLCs and waveplates can yield switching action. All of these combinations operate using the following principles:

(1) A CLC layer splits input light into a right and a left circularly polarized component. One component is reflected and the other is transmitted. The reflected component will have the same rotary sense as that of the CLC helix, while the transmitted component will have the opposite circular sense.

(2) Passage of circularly polarized light through an effective ½-wave delay changes the circular sense of right-handed light to left, and vice-versa.

(3) Reflection at normal incidence of circularly polarized light from a mirror changes its circular sense from left to right, and vice-versa. In contrast, reflection near normal incidence of circularly polarized light from a CLC layer of the same circular sense does not change the circular sense of the light.

(4) Circularly polarized light incident upon a ¼-waveplate is converted to linearly polarized light. At normal incidence, linearly polarized light experiences zero phase shift upon reflection from a mirror. If this reflected beam is subsequently directed back through the original ¼-waveplate, it is reconverted to its original circular polarization state. The combination of a ¼-waveplate followed by a mirror thus functions as a retro-reflector of normally incident circularly polarized light which does not change the circular sense of the light.

(5) Passage of unpolarized light through a waveplate of any delay leaves the polarization state of the light unchanged for the purposes of analyzing switch operation.

(6) Any waveplate which is called "½-wave" can also include plates with delay of 3/2, 5/2, etc. Similarly, a "¼-wave" plate is equivalent to a plate with delay ¾, 5/4, etc., and a delay of zero can also mean any integral delay of 1, 2, etc. waves.

In general, the phase shift that occurs when light passes through a waveplate or is reflected from a mirror is dependent on the angle of incidence. However, both waveplates and mirrors can be designed to yield specific phase shifts for a given angle of incidence, and it should be noted that these factors would be taken into consideration in any practical switch design.

Figure 5:
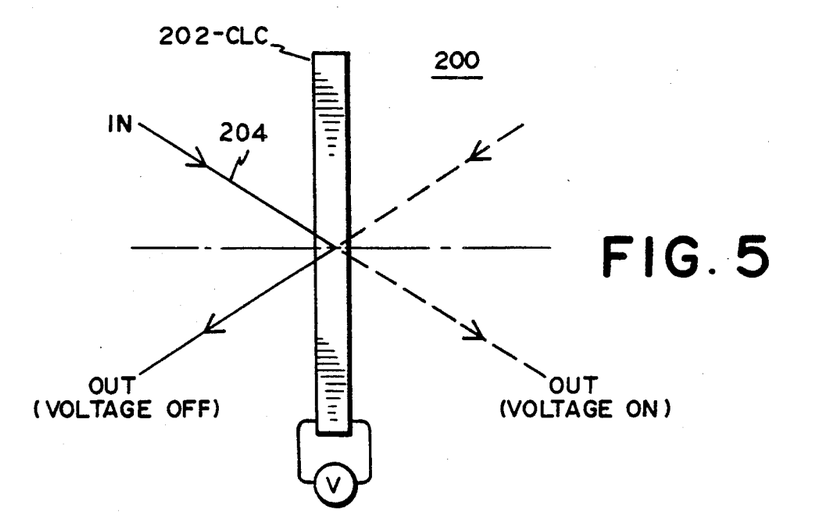
FIG. 5 is a schematic illustration showing the operational modes of a second active CLC optical switch configuration.
Figure 6A:
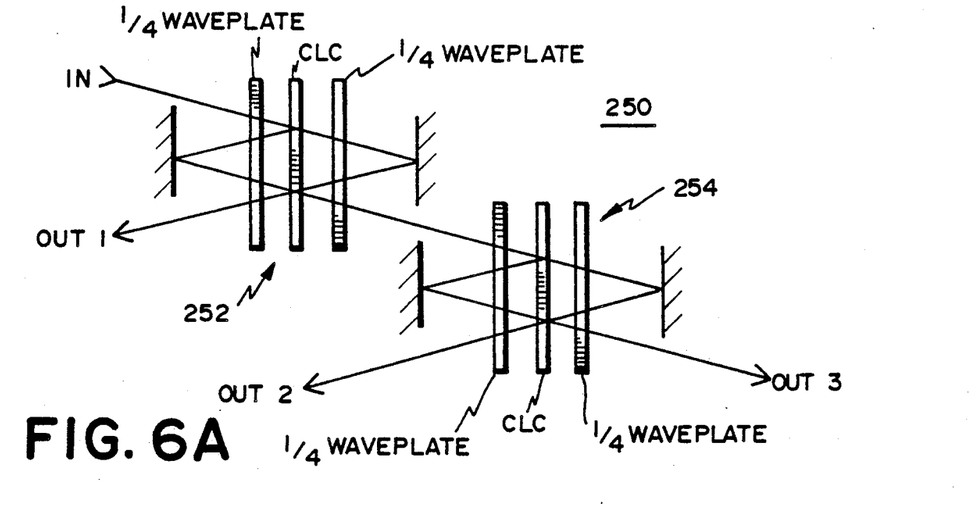
FIGS. 6A and 6B are schematic illustrations showing two different configurations of multiple output optical switches.
Figure 6B:
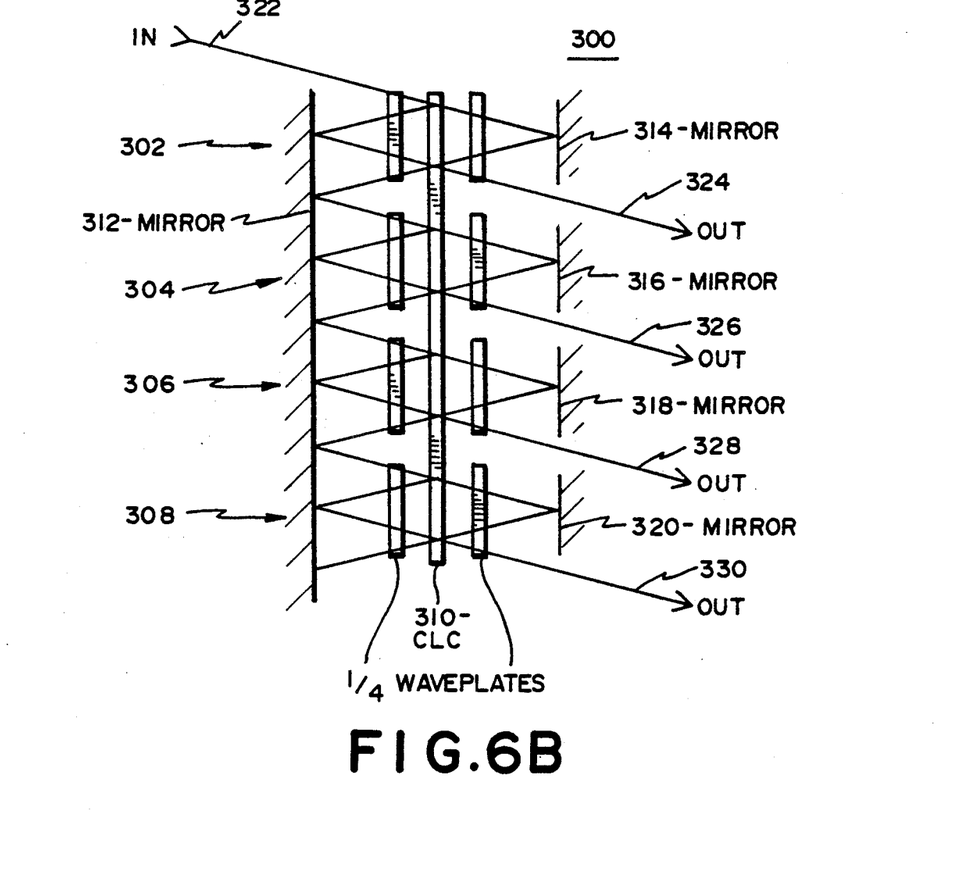
Figure 7A:
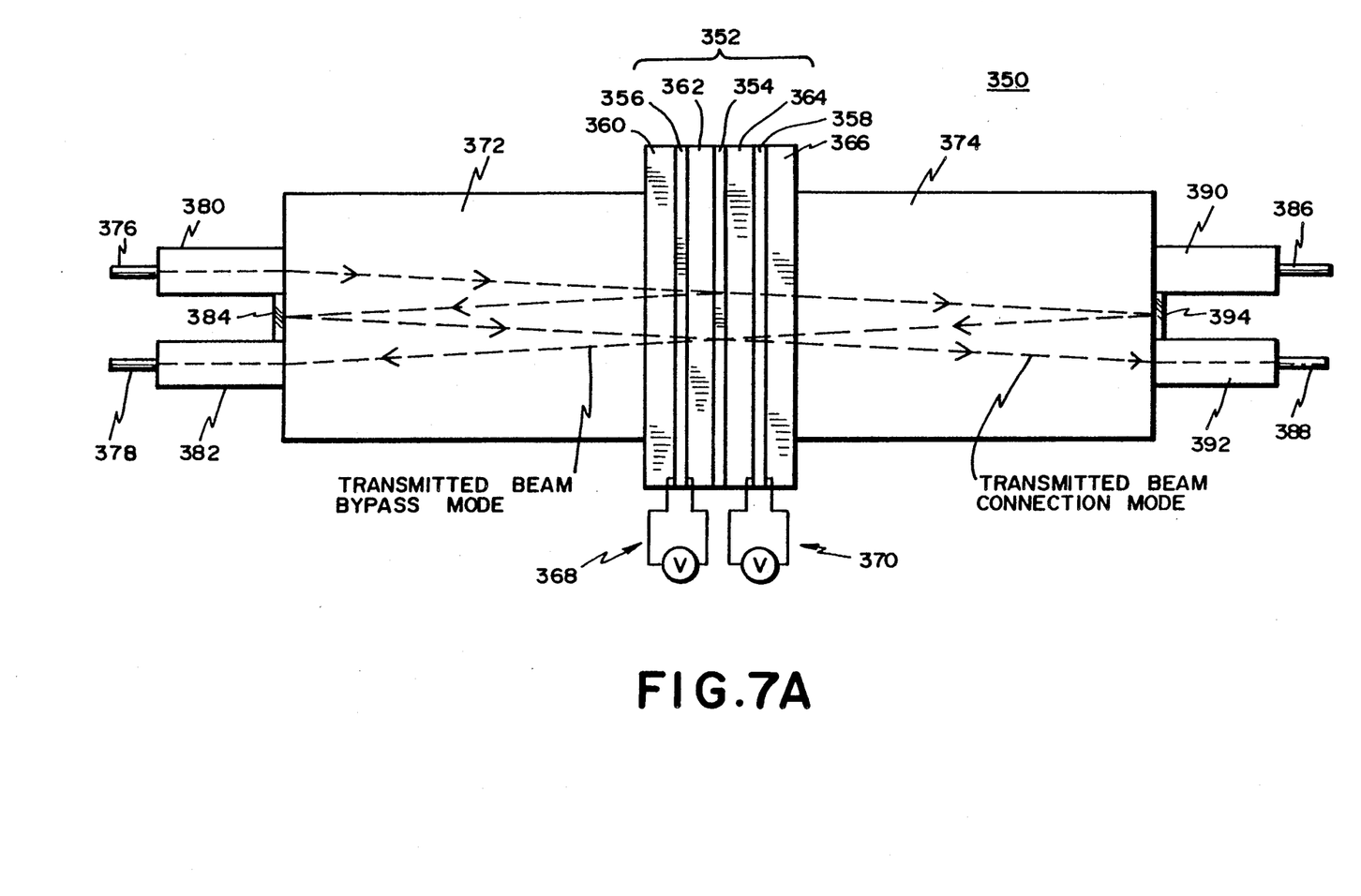
FIGS. 7A-C are diagrammatical illustrations of three structural embodiments of the invention which utilize GRIN lenses.
Figure 7B:
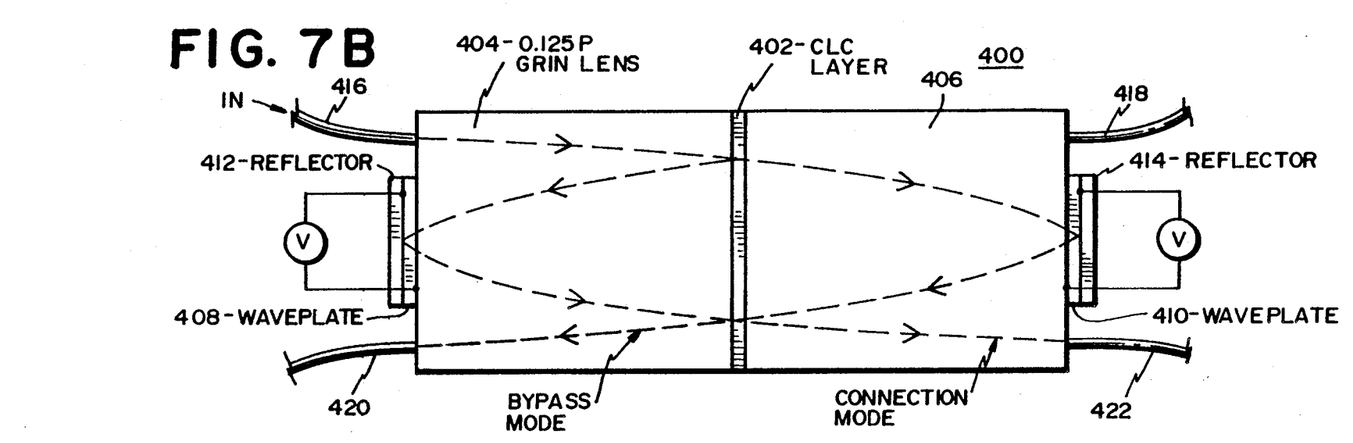
Figure 7C:
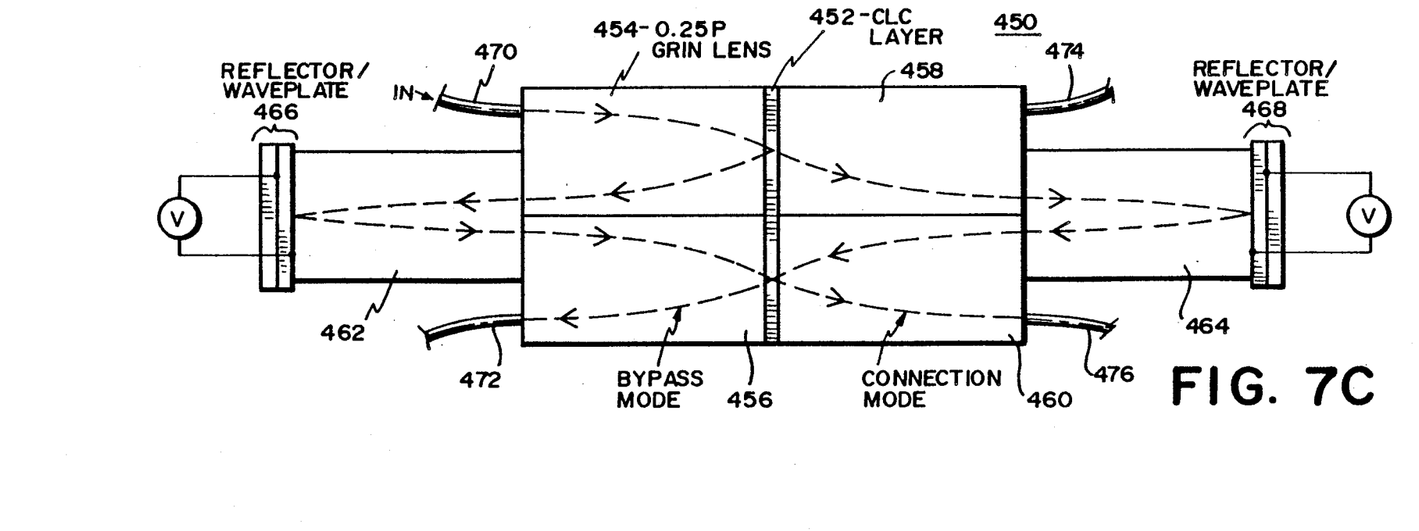
Figure 8A:
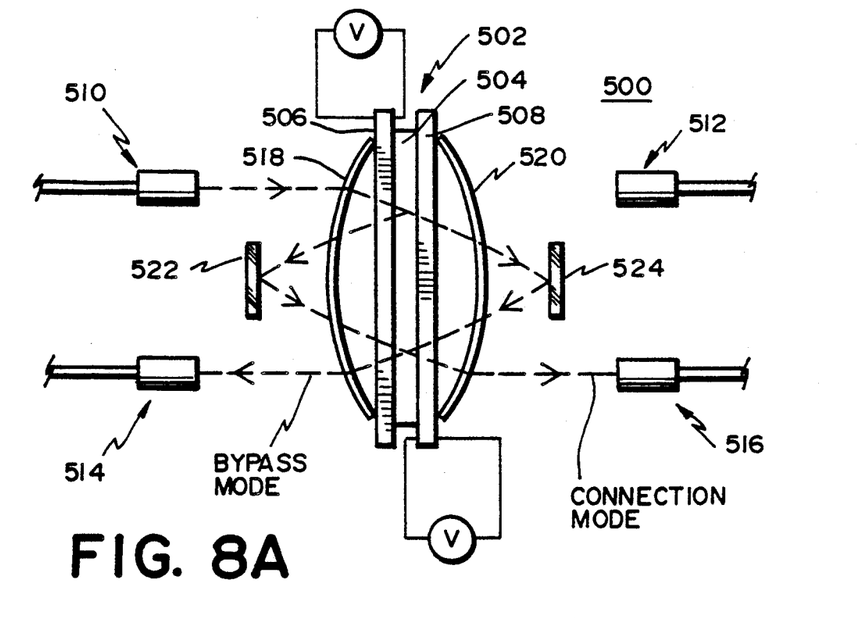
FIGS. 8A and 8B are diagrammatic illustrations of two structural embodiments of the invention which utilize conventional optical elements; and, FIG. 9 is a diagrammatic illustration of a structural embodiment of the switch configuration of FIG. 5.
Figure 8B:
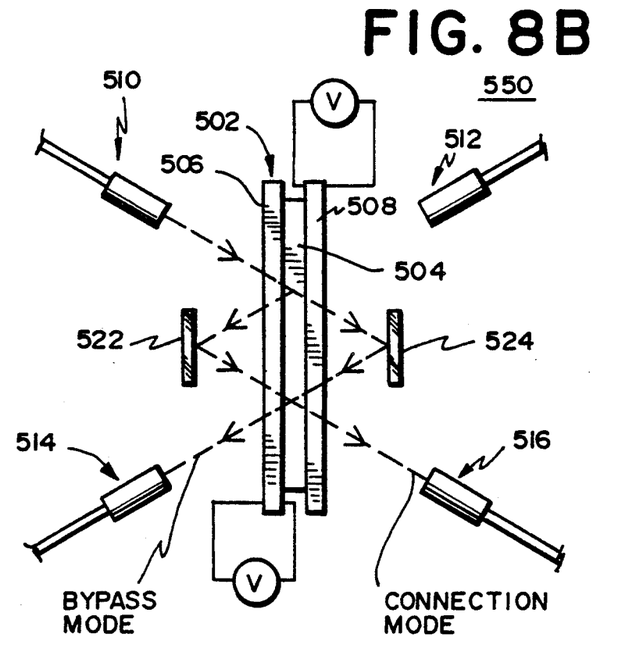
Figure 9:
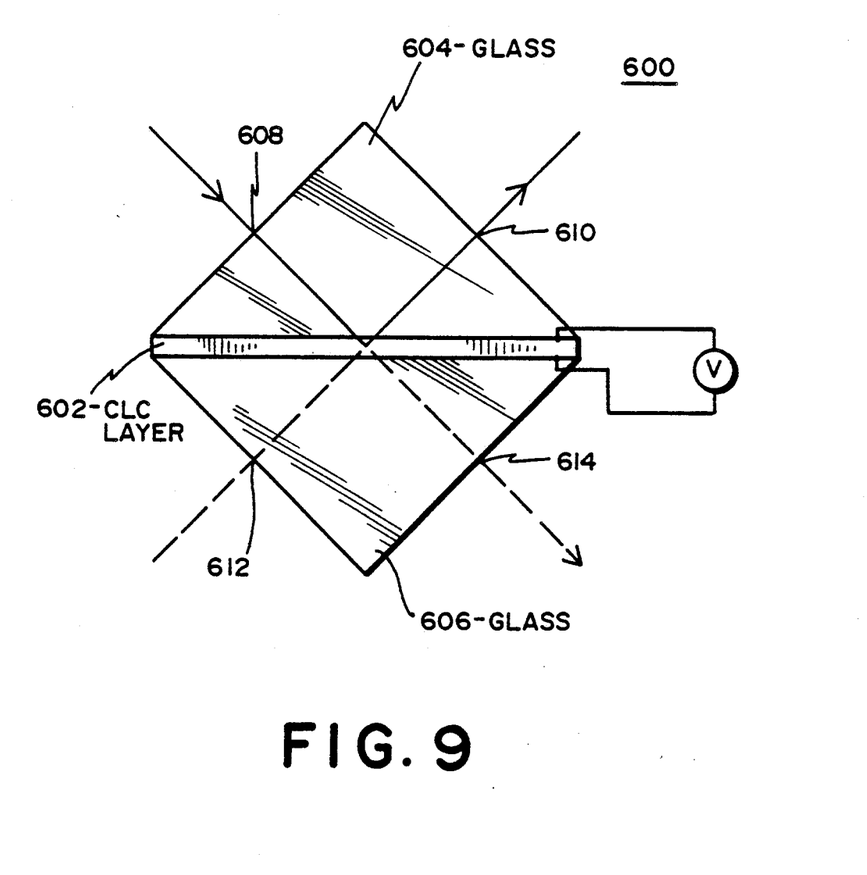

FIGS. 1-6 illustrate schematically a variety of generalized switching methods using CLCs, and applying the above principles. FIGS. 7-9 illustrate a number of structural embodiments which incorporate these methods. It will be understood that these switch designs do not cover all possible configurations. A host of similar designs can be made by configuring and adding elements according to the design rules above.

Figure 1A:
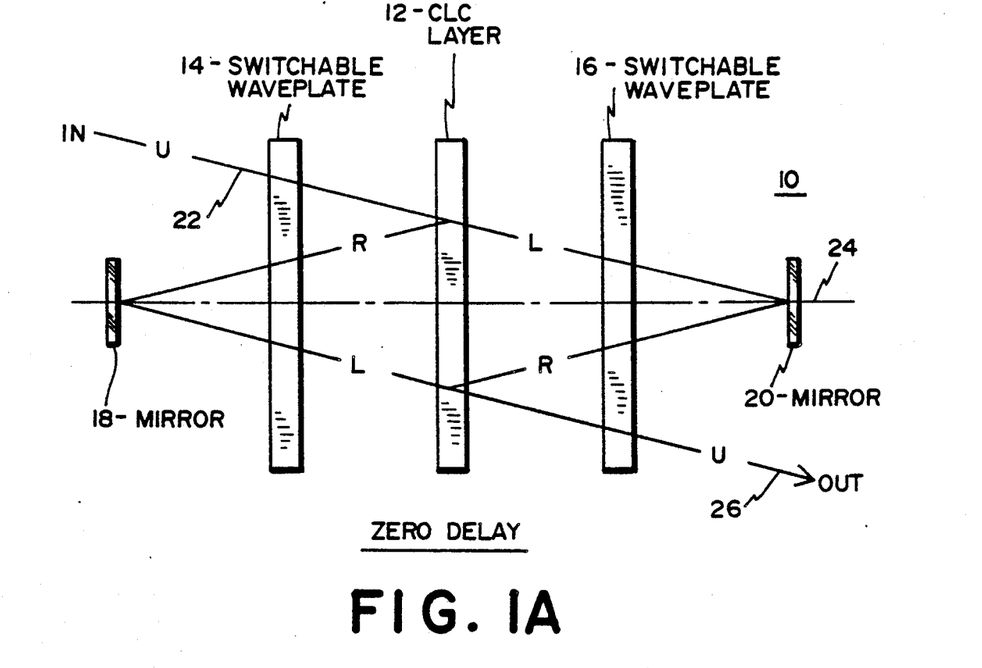
FIGS. 1A and 1B are schematic illustrations showing the operational modes of a first passive CLC optical switch configuration.
Figure 1B:
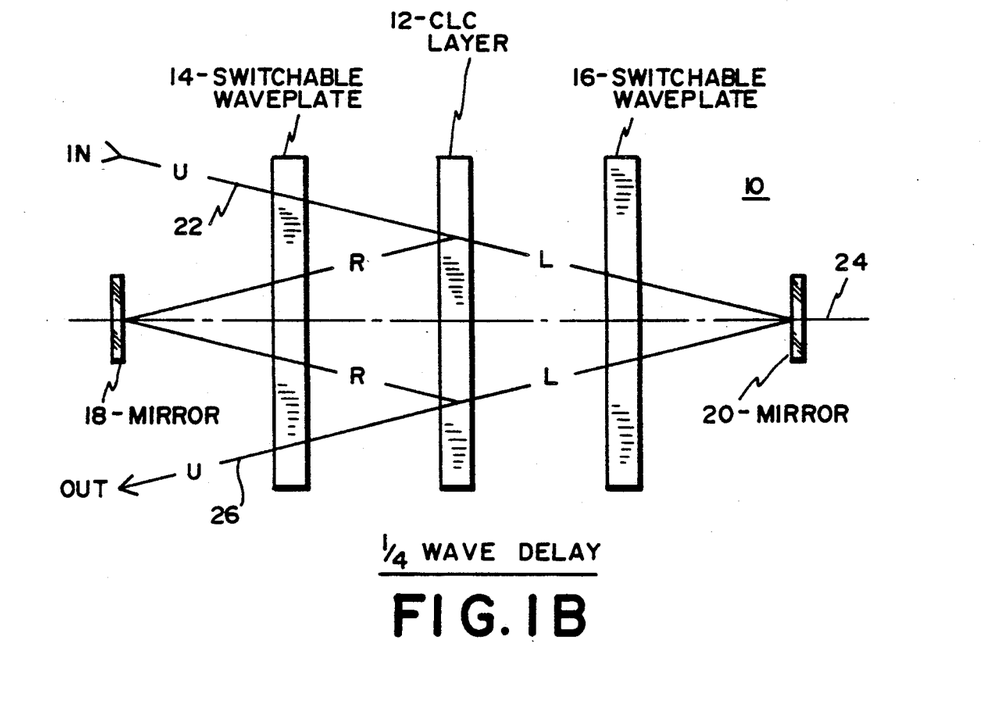

FIGS. 1A and 1B illustrate the schematic operation of a first CLC optical switch 10. In particular, a CLC layer 12 is shown disposed between a pair of conventional switchable quarter waveplates 14 and 16, which can be liquid crystal, electro-optic, or non-linear devices, among others. A first mirror 18 is disposed to the left of switchable waveplate 14, while a second mirror 20 is disposed to the right of the switchable waveplate 16.

An incoming unpolarized (denoted by U in FIGS. 1A and 1B) light beam 22 passes through waveplate 14 and is incident on CLC layer 12 at a small angle with respect to a central axis 24 that passes through the elements 12-20. This beam is nearly parallel to the helical axis of the CLC layer so that unpolarized beam 22 will be split by the CLC layer 12 into separate orthogonal circular polarized components. In particular, if CLC layer 12 has a right handed helical structure, for example the right circularly polarized component R is specularly reflected, while the left circularly polarized component L is transmitted unaltered. In FIG. 1A, switchable waveplates 14 and 16 are in the zero delay state so that the circular polarization states of components R and L, will pass through them unaltered. Left component L will therefore be reflected off of mirror 20 as a right component R, and directed back toward CLC layer 12 where it will be recombined with left component L, which is reflected off of mirror 18. When the two components combine in CLC layer 12, a new unpolarized light beam 26 is formed which travels away from CLC switch 10 in the same direction as the beam reflected from mirror 18.

If switchable waveplates 14 and 16 are in the quarter-wave delay state as illustrated in FIG. 1B, as the polarized components L and R pass through them twice going to, and coming from, mirrors 20 and 18, respectively, the light is converted to linearly polarized light, reflected, and then reconverted into circularly polarized light of the same sense. Thus the left component L is returned to CLC layer 12 as an L component, and similarly, the R component returns as an R component. When the two components recombine in CLC layer 12, the resulting outgoing unpolarized beam 26 will travel in the same direction as the beam reflected from mirror 20.

Figure 2A:
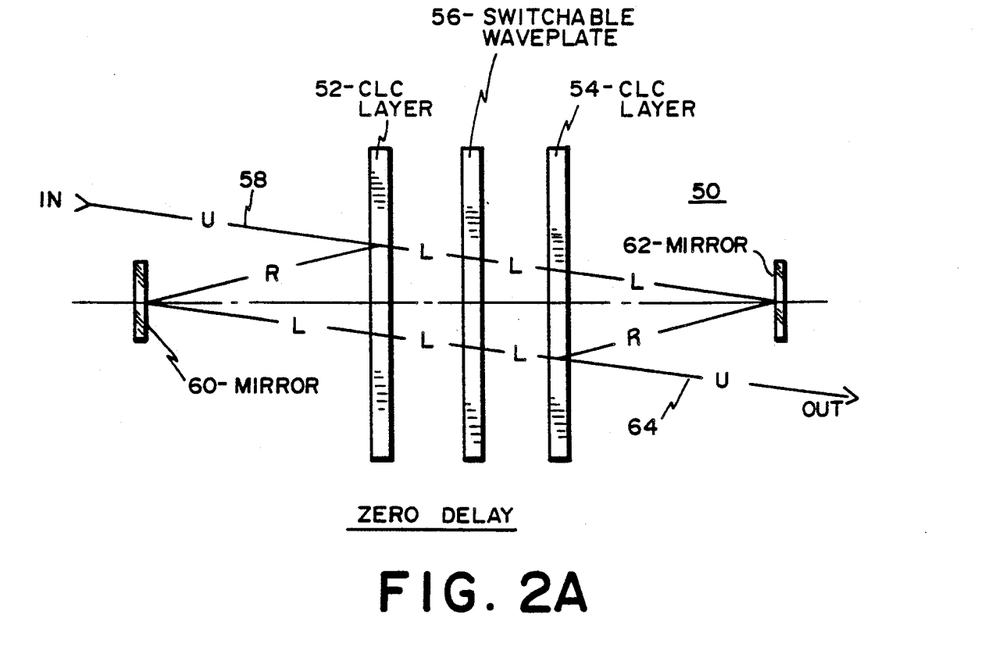
FIGS. 2A and 2B are schematic illustrations showing the operational modes of a second passive CLC optical switch configuration.
Figure 2B:
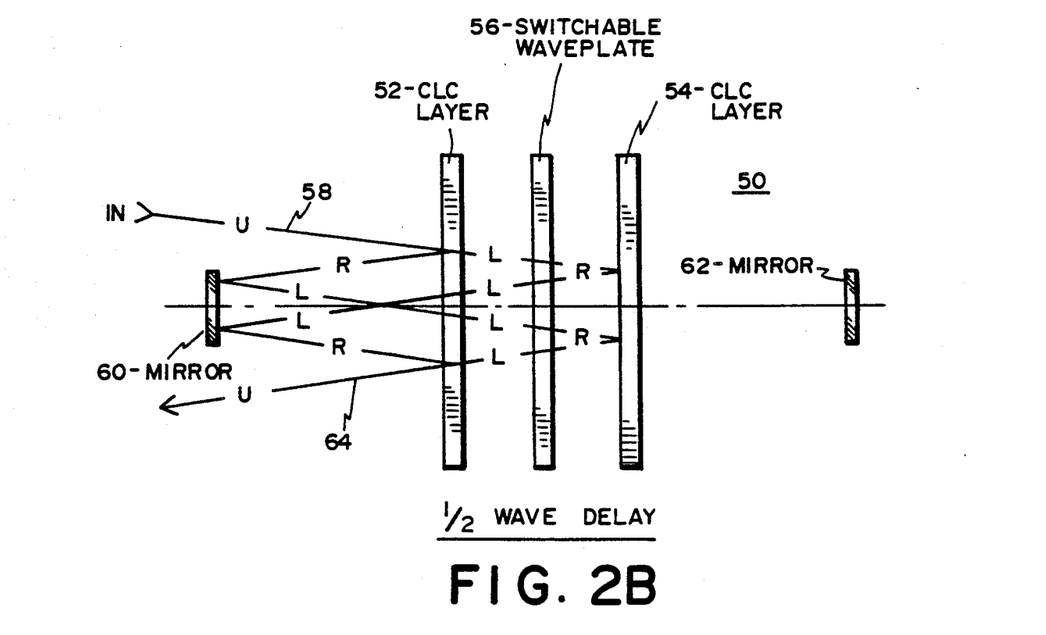

Other configurations of CLCs and switchable waveplates can yield similar switching behavior. FIGS. 2A and 2B illustrate the operation of a switch 50 using two CLC layers 52 and 54, and a single switchable waveplate 56 with a one-half wave delay. CLC layers 52 and 54 are both of the same helical sense, taken in this example to be reflective to the right circular component. When waveplate 56 is in its zero delay state, as in FIG. 2A, an incoming unpolarized light beam 58 is split into right and left circular components, R and L, by CLC layer 52. The right-hand component R is reflected toward a first mirror 60 where it is retro-reflected as a left-circular beam. This beam then passes through CLC layer 52 and waveplate 56 unchanged, and combines in CLC layer 64 with the other component that has been reflected by a second mirror 62. These two components combine to form an unpolarized output beam 64 that travels in the same direction as the component reflected off of first mirror 60.

When switchable waveplate 56 is in its ½-wave delay state, light passing through waveplate 56 is changed from left to right, and vise-versa, and the beam paths in the switch 50 are as shown in FIG. 2B. Now, the right and the left components R and L, are reflected by the CLC layers 52 and 54, respectively, toward first mirror 60. When the components recombine in CLC layer 52, the unpolarized output beam 64 travels in a direction opposite to that of the components reflected off of mirror 60.

It should be understood that while the helical sense of CLC layers 52 and 54 is chosen so that right handed circular polarized components are reflected, the helical sense of both of layers 52 and 54 could be changed to alter the direction of output beam 64 as desired.

Figure 3A:
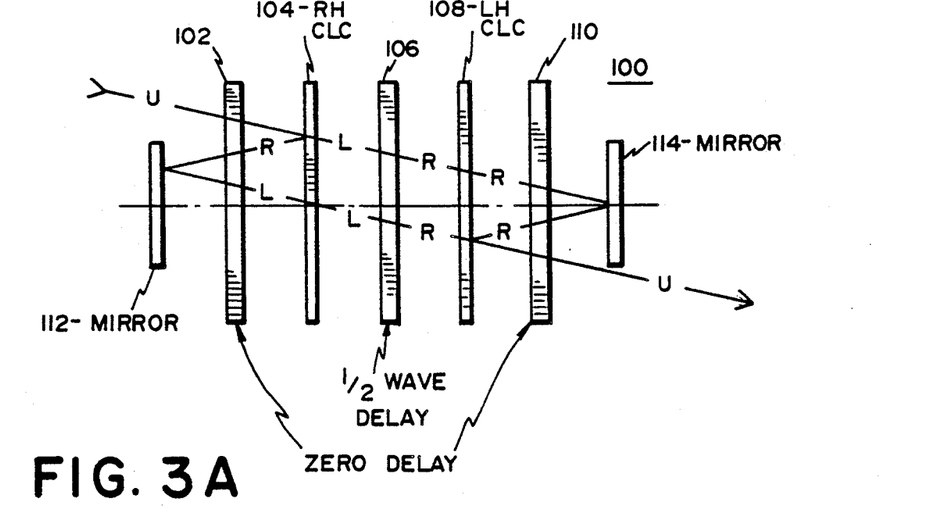
FIGS. 3A and 3B are schematic illustrations showing the operational modes of a third passive CLC optical switch configuration.
Figure 3B:
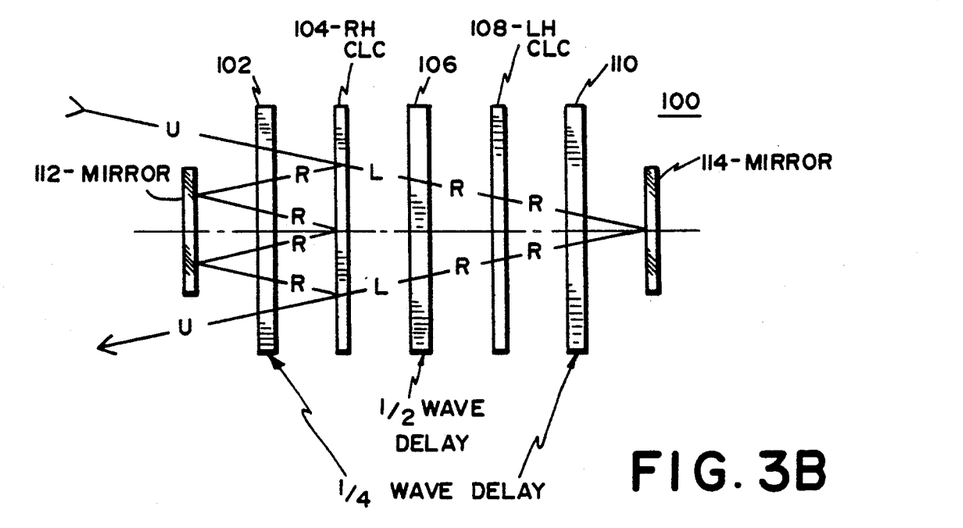

Another representative example of a passive CLC switch is illustrated in FIGS. 3A and 3B. In particular, a CLC switch 100 is shown which is formed in order of a first switchable quarter waveplate 102; a first CLC layer 104; a half waveplate 106; a second CLC layer 108; and, a second quarter waveplate 110. A first mirror 112 is positioned to the left of first quarter waveplate 102, while a second mirror 114 is positioned to the right of second quarter waveplate 110.

In the operation illustrated in FIGS. 3A and 3B, first CLC layer 104 is right hand component reflective, while the second CLC layer 108 is left hand component reflective. Switching of quarter waveplates 102 and 110, while maintaining half waveplate 106 in the half wave delay state, results in the illustrated beam paths. Again, it will be understood that the helical sense of CLC layers 104 and 108, and the operational state of switchable waveplates 102, 106, and 110, can be varied to achieved any desired beam paths.

Figures 4A, 4B:
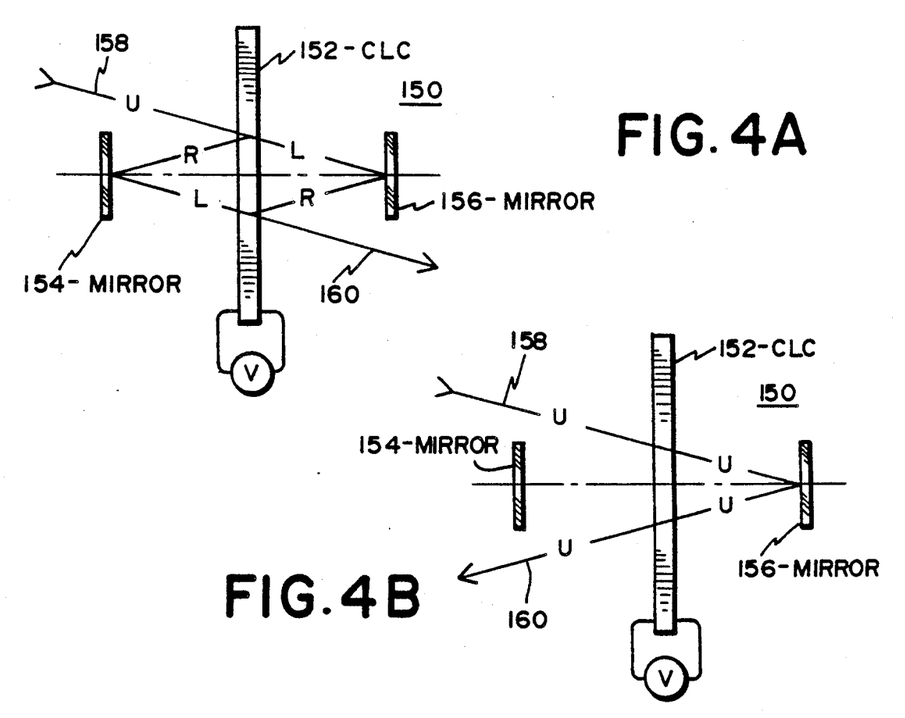
FIGS. 4A and 4B are schematic illustrations showing the operational modes of a first active CLC optical switch configuration.

CLCs can also be used in an active mode wherein the CLCs themselves can be switched between two states of transmission. The transmission characteristics of CLC layers can be modified by applying electric or magnetic fields, or by increasing the temperature so as to convert the CLCs to the nematic or isotropic phases. In these phases, the CLC later no longer functions as a beamsplitter and transmits all polarizations equally. A simple example is illustrated in FIGS. 4A and 4B. In particular, a switch 150 is shown including an active CLC layer 152, and a pair of mirrors 154 and 156. A switchable source of voltage V is connected across CLC layer 152. With no voltage applied, CLC layer 152 remains in the cholesteric phase, and splits an incoming unpolarized light beam 158 into polarized components as shown in FIG. 4A. In this mode, an outgoing beam 160 leaves the switch 150 in the same direction as incoming beam 158.

Now, when a voltage is applied to CLC layer 152, it will switch to its isotropic phase, and the incoming beam 158 will pass through the layer unaltered, be reflected off of mirror 156, and leave as outgoing beam 160 in the opposite direction, as illustrated in FIG. 4B.

FIG. 5 illustrates another type of simple active CLC switch 200 which is comprised solely of a single active CLC layer 202. This device utilizes oblique incidence diffraction techniques. At a suitable angle of incidence, complete specular reflection of all polarizations of incident light occurs over a narrow range of wavelengths near the helix pitch length of the CLC layer 202. By directing an incoming light beam 204 at CLC layer 202 at a suitable angle, it will normally be totally reflected due to this characteristic. However, if heat or an electric or magnetic field is applied to CLC layer 202 (with a voltage source V for example) to effect a phase change, the incident light beam 204 will now be completely transmitted as shown.

Optical switches having multiple output paths or ports can also be easily constructed using the basic 2 input, 2 output (2×2) switches described above. For example, FIG. 6A illustrates a three output switch 250 which is formed from two series cascaded switches 252 and 254 of the same configuration as the switch 10 of FIG. 1. Similarly, FIG. 6B illustrates a multiple output switch 300 which is constructed from a plurality of parallel cascaded switches 302, 304, 306 and 308. A single CLC layer 310 is employed for all of the individual switches, as is a single left mirror 312. A plurality of individual right mirrors 314–320 are employed to permit an input beam 322 to be directed as anyone of four output beams, 324–330.

FIGS. 7A-C illustrate three structural embodiments for switching light beams between two pairs of optical fibers. These particular embodiments will work equally well with any generalized switching method which uses a single mirror reflection.

It should be noted that in many cases, it is advantageous to attach collimating elements to the fibers in a device, and several of the designs described below reflect this fact. However, the presence or absence of collimating elements in any particular design does not change the switching function of the device.

The embodiments of FIGS. 7A-C utilize graded-index (GRIN) micro-optic lenses. The operation of these switches is illustrated by the dashed lines indicating the bypass and connection modes, which correspond to the two states of the switching structure. The beam paths of each of these switches depend upon the specific configuration of the GRIN lenses. In cases where the pitches of GRIN lenses are indicated, it should be noted that these values are approximate. In any real device, the actual pitch of the GRIN lenses will depend on the physical factors of the device configuration (e.g., the dimensions of the switching structure).

FIGS. 7A illustrates a first structural embodiment for switching light beams between two pairs of optical fibers using the general arrangement of FIG. 1. In particular, an optical switch 350 is shown which includes a centrally disposed layered switching structure 352 comprising a CLC layer 354, two switchable quarter waveplates 356 and 358, and a plurality transparent material layers 360-366 which are disposed between, and on either side of, these three layers. A switchable source of potential V is supplied to waveplates 856 and 858 via two pairs of lead wires 368 and 370 for selectively causing the waveplates to introduce a quarter wave delay into the circularly polarized light beams passing therethrough as in FIG. 1

Disposed on either side of switching structure 352 are first and second graded-index (GRIN) micro-optic lenses 372 and 374 (each of approximately one eighth pitch). Micro-optic lens 372 serves to direct light between a first pair of fiber optics 376 and 378 and CLC layer 354 via a pair of collimating lenses 380 and 382, respectively. As illustrated by the dashed lines in FIGS. 7A, the off-axis imaging properties of the lens 372 causes light entering from fiber optic 376 to gradually bend so that it will strike CLC layer 354 at an angle nearly parallel to its helical axis. A reflective coating 384 is centrally disposed on the end of lens 372 opposite sandwich structure 352 which acts as a reflecting mirror that serves the same purpose as reflecting mirror 18 in FIG. 1. Similarly, GRIN lens 374 acts to direct light between switching structure 852, a second pair of fiber optics 386 and 388, and a pair of corresponding collimating lenses 390 and 392. Again, a centrally disposed reflective coating 394 is disposed on the end of lens 374 opposite switching structure 352 which corresponds to the mirror 20 of FIG. 1.

In the operation of fiber optic switch 350, when switchable waveplates 356 and 358 are in the zero delay state, the switch is in the bypass mode corresponding to FIG. 1B so that light entering fiber optic 376 will be reflected and transmitted back through fiber optic 378 as illustrated by the dashed lines. If a potential is applied to switchable waveplates 356 and 358 so that they introduce a quarter wave delay into each polarized component as it passes through, the switch will be in the connection mode as in FIG. 1A, and light entering fiber optic 376 will be transmitted to fiber optic 388 as illustrated. Similarly, light entering fiber optic 378 will be transmitted through to fiber optic 386, although this path is not illustrated by the dashed lines in FIG. 7A.

Although the embodiment of FIG. 7A employees a centrally disposed switching structure 352, it should be understood that the various components of a given switching structure could be placed at various places in a particular embodiment without changing the switching function. This is illustrated in FIG. 7B, in which a switch 400 includes a centrally disposed CLC layer 402 which is sandwiched between a pair of GRIN lenses 404 and 406. In this embodiment, first and second switchable waveplates 408 and 410 are placed between the outside ends of lenses 404 and 406, and first and second reflectors 412 and 414, respectively. This is in contrast to the embodiment of FIG. 7A, in which the waveplates and the CLC layer are all combined in switching structure 352. As illustrated, waveplates 408 and 410, control switching of light among a plurality of optical fiber 416-422. In addition, no collimating elements are employed with the embodiment of FIG. 7B, which reduces overall cost.

FIG. 7C illustrates that GRIN lenses having different pitches can also be employed. In particular, another optical switch 450 is shown which, includes a centrally disposed CLC layer 452 between two pairs of one quarter pitch GRIN lenses 454-460. In addition fifth and sixth quarter pitch GRIN lenses 462 and 464 are disposed next to the outside ends of lenses 454 and 456 and 458 and 460, respectively. First and second reflector/switchable waveplate structures 466 and 468 are disposed on the outside ends of GRIN lenses 462 and 464, respectively, which serve to control the switching of light beams among a plurality of optical fibers 470-476. This construction is advantageous since clearance problems between optical fibers 470-476 and reflector/waveplate structures 466 and 468 are avoided.

It will be understood that numerous other arrangements of GRIN lenses and switching structures could be constructed without departing from the spirit and scope of the invention.

Turning now to FIGS. 8A and 8B, two different CLC optical switches which employ conventional optical elements are shown. In particular, an optical switch 500 is shown in FIG. 8A and an optical switch 550 is shown in FIG. 8B, both of which include a three layer liquid crystal switching structure 502 comprised of a central CLC layer 504, and two outer layers of nematic liquid crystal material 506 and 508 which act as the switchable quarter waveplates. It will be understood that switching structure 502 could be configured in accordance with any of the generalized switching methods of FIGS. 1-4.

Four fiber optics and associated collimating lenses 510-516 are associated with each of the switches 500 and 550. Switch 500 further includes first and second spherical lenses 518 and 520 which serve to bend incoming light beams at an angle nearly parallel to the helical axis of CLC layer 504 so that all of the fiber optics can be disposed parallel to one another as shown. As with the previous embodiment, each of the switches 500 and 550 includes a pair of planar reflecting mirrors 522 and 524 for reflecting the circularly polarized components of light back to CLC layer 504.

In FIG. 9, a switch 600 is shown which operates according to the oblique diffraction principle discussed previously in conjunction with FIG. 5, and includes a centrally disposed CLC layer 602 that is sandwiched between two triangular shaped blocks of glass 604, and 606. The average refraction indices of the CLC layer 602 and the glass must be carefully matched to minimize Fresnel reflections at the glass—CLC interfaces. Four optical ports 608-614 are formed, one each, by each of the exposed faces of the glass blocks 604 and 606. In the passive mode, port 608 is connected to port 610, and port 612 is connected to port 614. When an electric or magnetic field or heat is applied to CLC layer 602 (by source f voltage V shown for example), the incoming light will no longer be reflected, and port 608 will be connected to port 614 while port 610 will be connected to port 612.

Although the invention has been disclosed in terms of preferred embodiments, it will be understood that numerous variations and modifications could be made thereto without departing from the true spirit and scope thereof as defined by the following claims.

What is claimed is:

1. An optical switch comprising:
   at least a first layer of a cholesteric or chiral nematic liquid crystal for decomposing an incident light beam into first and second circularly polarized components, one of which is transmitted by said layer, and the second of which is reflected by said layer;
   first and second reflector means disposed, one on each side of said layer, for reflecting both of said circularly polarized components back toward said layer to recombine them into a transmitted light beam; and,
   means to selectively switch the direction of said transmitted beam comprising means to selectively switch the circular polarization sense of said polarized components before they are recombined in said liquid crystal layer.

2. The optical switch of claim 1 in which said means to switch the direction comprises first and second switchable waveplates disposed, one each, in the optical paths of said first and second circularly polarized components, between said layer and said first and second reflector means, said switchable waveplates being operable to selectively change the polarization of said components.

3. The optical switch of claim 2, wherein said first and second waveplates and said corresponding first and second reflector means are formed integrally together.

4. The optical switch of claim 2, wherein said waveplates and said layer are formed integrally together.

5. The optical switch of claim 3, further including at least first and second lens means disposed, one each, between said layer and said integral first and second reflector means and first and second waveplates.

6. The optical switch of claim 4, further including at least a first lens means disposed, between said first reflector means and said integral layer and waveplates, and a second lens means disposed between said second reflector means and said integral layer and waveplates.

7. The optical switch of claim 2, further including:
   at least a second layer of a cholesteric or chiral nematic liquid crystal disposed parallel to said first layer between said first layer and said first switchable waveplate: and,
   at least a third switchable waveplate disposed between said first and second liquid crystal layers.

8. The optical switch of claim 7, wherein the circular senses of said first and second layers are opposite from one another so that said first layer transmits light of a first circular polarization sense, and said second layer transmits light of a second opposite polarization sense.

9. The optical switch of claim 1, further including:
   at least a second layer of a cholesteric or chiral nematic liquid crystal positioned to received a transmitted light beam from said first layer and decompose it into third and fourth circularly polarized components, one of which is transmitted by said second layer, and the other of which is reflected by said second layer;
   third and fourth reflector means disposed, one on each side of said second layer for reflecting said third and fourth circularly polarized components back toward said second layer to recombine them into a second transmitted light beam; and,
   means to selectively switch the direction of said second transmitted light beam comprising means to selectively switch the circular polarization senses of said third and fourth polarized components before they are recombined in said second layer;
   whereby, said optical switch can switch a light beam in more than two directions.

10. An optical switch comprising:
    at least a first and a second layer of a cholesteric or chiral nematic liquid crystal disposed parallel to, and spaced from, one another for decomposing an incident light beam into circular polarized components;
    first and second reflector means disposed, one to reflect a circular polarized light beam component reflected by said first layer back toward said first layer, and a second to reflect a circular polarized component transmitted by said second layer back toward said second layer; and,
    switchable waveplate means disposed between said first and second layers for selectively changing the circular sense of polarized light components traveling between said layers;
    whereby, the direction of a transmitted light beam that is formed by recombination of circular polarized light components in said layers is selectively changed by said switchable waveplate means.

11. An optical switch comprising:
    at least a first layer of a cholesteric or chiral nematic liquid crystal;
    means to change the phase of said layer whereby an unpolarized light beam can be selectively separated into two circularly polarized components by said first layer; and,
    first and second reflector means disposed, one on each side, of said layer to reflect light beams back toward said layer.

12. A method of switching the direction of beams of light comprising the steps of:
    directing a beam of light to be switched at a layer of cholesteric or chiral nematic liquid crystal at an angle nearly parallel to a helix axis of the crystal, and in so doing, separating said beam of light into first and second circularly polarized components, one of which is transmitted by said layer, and the other of which is reflected by said layer;
    reflecting both said polarized components back toward said liquid crystal layer, and thereby recombining said polarized components into a transmitted light beam; and,
    selectively causing said transmitted light beam to be transmitted in one of two directions by selectively changing the circular polarization sense of said polarized components before they are recombined by said liquid crystal layer.

13. A method of switching the direction of beams of light comprising the steps of:
   directing a beam of light to at least a first layer of a chiral nematic liquid crystal to an angle nearly parallel to a helix axis of said layer so that the incoming light will be decomposed thereby into first and second circularly polarized components; and
   selectively changing the phase of said first layer to change its effects on the transmission and reflection of said beam of light.

14. The optical switch of claim 5 wherein said first and second lens means are each GRIN lenses.

15. The optical switch of claim 14 wherein said GRIN lenses are each approximately one eight pitch GRIN lenses.

16. The optical switch of claim 6 wherein said first and second lens means are each GRIN lenses.

17. The optical switch of claim 16 wherein said GRIN lenses are each approximately one eighth pitch GRIN lenses.

18. The optical switch of claim 6 wherein said first and second lens means are each spherical lenses.

* * * * *

UNITED STATES PATENT AND TRADEMARK OFFICE
CERTIFICATE OF CORRECTION

PATENT NO. : 4,991,924

DATED : February 12, 1991

INVENTOR(S) : NARENDRA K. SHANKAR ET AL.

It is certified that error appears in the above-identified patent and that said Letters Patent is hereby corrected as shown below:

On the cover page of the patent, Item 73, the Assignees, should read --Cornell Research Foundation, Inc., Ithaca, N.Y.;

E. I. du Pont de Nemours & Company, Wilmington, Del.--

Signed and Sealed this

Twenty-third Day of June, 1992

Attest:

DOUGLAS B. COMER

*Attesting Officer*     *Acting Commissioner of Patents and Trademarks*